United States Patent
Chuang et al.

(10) Patent No.: US 7,688,694 B2
(45) Date of Patent: Mar. 30, 2010

(54) DYNAMICALLY SELECTING WRITE STRATEGY FOR WRITING DATA TO AN OPTICAL DISC

(76) Inventors: Ying-Lang Chuang, 8F, 533, Chung-Cheng Rd., Hsin-Tien, Taipei (TW); Jarvis Wang, 8F, 533, Chung-Cheng Rd., Hsin-Tien, Taipei (TW); Chih-Chiang Yang, 8F, 533, Chung-Cheng Rd., Hsin-Tien, Taipei (TW)

( * ) Notice: Subject to any disclaimer, the term of this patent is extended or adjusted under 35 U.S.C. 154(b) by 1012 days.

(21) Appl. No.: 10/959,074

(22) Filed: Oct. 7, 2004

(65) Prior Publication Data

US 2005/0099912 A1    May 12, 2005

(30) Foreign Application Priority Data

Nov. 10, 2003  (TW) ............................... 92131365 A

(51) Int. Cl.
*G11B 7/00* (2006.01)
(52) U.S. Cl. .................................................. 369/59.11
(58) Field of Classification Search ............... None
See application file for complete search history.

(56) References Cited

U.S. PATENT DOCUMENTS

| | | | | |
|---|---|---|---|---|
| 6,459,666 B1 * | 10/2002 | Yokoi | ..................... | 369/47.15 |
| 7,006,419 B2 * | 2/2006 | Yokoi | ..................... | 369/59.11 |
| 2003/0081517 A1 | 5/2003 | Kim | | |
| 2003/0141994 A1 | 7/2003 | Ishioka et al. | | |
| 2003/0151994 A1 | 8/2003 | Tasaka et al. | | |

FOREIGN PATENT DOCUMENTS

| | | |
|---|---|---|
| CN | 1400590 | 3/2003 |
| JP | 200385753 | 3/2003 |
| TW | 463144 | 11/2001 |
| TW | 494386 | 7/2002 |
| TW | 498310 | 8/2002 |
| TW | 548633 | 8/2003 |
| WO | WO-03030153 A2 | 4/2003 |

OTHER PUBLICATIONS

TW 092131365, Search Report, Nov. 26, 2007.

* cited by examiner

*Primary Examiner*—Joseph H Feild
*Assistant Examiner*—Joseph Haley
(74) *Attorney, Agent, or Firm*—Perkins Coie LLP

(57) ABSTRACT

An optical data recording method for a disk drive having a plurality of rotation speeds. First, a plurality of write strategies corresponding to different possible rotation speeds of the disk drive is provided. Next, the practical rotation speed of the disk drive is detected. Next, the write strategy is selected according to the detected rotation speed of the disk drive. Next, optical data is written to an optical disc with the selected write strategy. Finally, the practical rotation speed of the disk drive is continuously detected during writing of optical data, and optical data is written to the optical disc with different write strategy when the practical rotation speed of the disk drive is changed to correspond to different write strategy.

22 Claims, 5 Drawing Sheets

DYNAMICALLY SELECTING WRITE STRATEGY FOR WRITING DATA TO AN OPTICAL DISC

BACKGROUND OF THE INVENTION

1. Field of the Invention

The present invention relates in general to a method for writing data to an optical disc, and in particular to a method using different data writing strategies according to the rotation speed of the disc drive.

2. Description of the Related Art

CDRW (ReWritable) drivers are designed to record data, video and other content from PC and other platforms. CDRW main factures recognize that content must be portable across various platforms.

The recording layer of a blank CDRW disc is polycrystalline, which is a phase-change material. During writing, a focused laser beam selectively heats partial areas of the phase-change material to be above the melting temperature of 500-700° C., so all the atoms in this area can move rapidly in the liquid state causing by the high temperature. When cooled with sufficiently quickly, the random liquid state is 'frozen-in' and the so-called amorphous state is obtained. If the phase-change layer is heated to below the melting temperature but above the crystallization temperature (200° C.) for a sufficient time (at least longer than the minimum crystallization time), the atoms revert back to an ordered state, i.e. the crystalline state.

The amorphous and crystalline states have different refractive indexes, and can therefore be optically distinguished. For a CDRW disc, the amorphous state has a lower reflectivity than in the crystalline state and, during read-out, this produces a signal identical to that of a regular dual layer CDRW disc, making it possible to read CDRW discs with CD-ROM drives and CD Video players.

The phase-change medium can be rewritten in a single pass of the focused laser beam. In the CDRW system, the data is recorded on discs by means of a write strategy, using different laser output levels. This strategy has two parts, a pulsed part (pulsing is necessary to write amorphous 'marks'), and a non-pulsed part, in which the strategy writes crystalline areas between the marks.

The write strategy is determined according to the type of optical disc, and the CDRW drive, and the recording speed. FIG. 1 shows a power waveform of one write strategy. In FIG. 1, the laser modulation strategy records the shortest 'pit' defined in the CD system, the '3T mark', and the write strategy to record 'no mark'. Recording a mark means creating a low-reflectivity (amorphous) region in the active layer, and recording no mark means creating a high-reflectivity (polycrystalline) region.

Different write strategies are implemented according to different predetermined ranges of optical data recording speed. For example, a first write strategy is used for recording data speed under 16×. Here, the pulse width of the first write strategy is adjustable to meet different data recording speeds under 16×. While the data recording speed exceeds 16×, the first write strategy does not conform to the data recording speed by adjusting the pulse width of the same write strategy. Thus, the recorded mark fails. Therefore, another write strategy is employed record data at a speed exceeding 16×.

The data recording speed of CDRW drive, however, may be determined according to the quality of the optical disc or performance of the host computer. In addition, in CAV (constant angular velocity) mode, the data recording speed is altered according to different recording radius of the optical disc. Moreover, the new data recording speed may correspond to a different write strategy. Thus, the conventional optical data recording method limits the recording speed to prevent the problems mentioned above.

SUMMARY OF THE INVENTION

The present invention provides a method of recording optical data. During data recording, the write strategy is dynamically switched or adjusted according to the practical (even instant) rotation speed of the disk drive. For example, the low-speed write strategy is switched to high-speed write strategy when the rotation speed of the disk drive is increased, the high-speed write strategy is switched to low-speed write strategy when the rotation speed of the disk drive is decreased, and the power waveform of the write strategy accordingly, thus improving optical data recording quality under different disk drive rotation speeds.

To achieve the above-mentioned contents, the present invention provides also an optical data recording method for a disk drive having a plurality of rotation speeds. First, a plurality of write strategies corresponding to different rotation speeds of the disk drive is provided. Next, the rotation speed of the disk drive is detected. The write strategy is then selected according to the rotation speed of the disk drive. Therefore, optical data is written to an optical disc with the selected write strategy. Finally, the rotation speed of the disk drive is continuously detected during optical data writing, and optical data is written to the optical disc with another write strategy when the rotation speed of the disk drive is changed and corresponds to another write strategy.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

As mentioned above, different predetermined ranges of optical data recording speed require different write strategies. For example, a first write strategy is employed to recording data at a speed under 16×. Here, the pulse width of the first write strategy is adjustable to meet different data recording speeds under 16×. When the data recording speed exceeds 16×, the first write strategy can not conform to the data recording speed by adjusting the pulse width. Thus, the size of the generated mark is too large, causing data recording failure. Therefore, another write strategy is defined to record data at a speed exceeding 16×.

Figure 1:
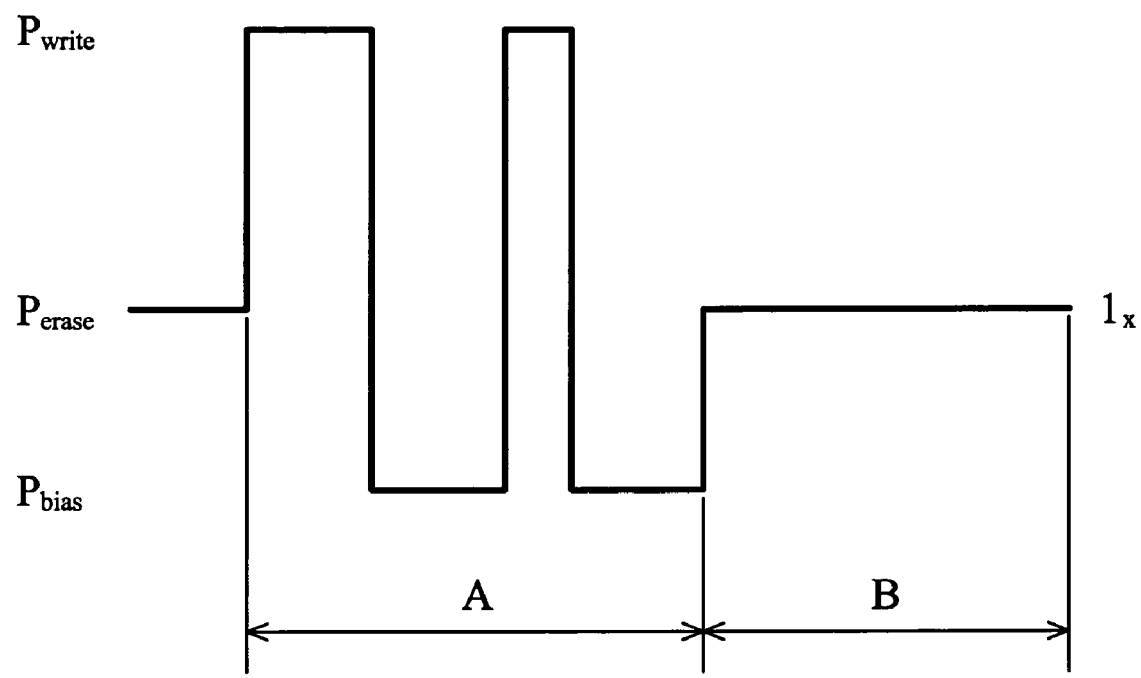
FIG. 1 shows a power waveform of one write strategy.
Figure 2A:
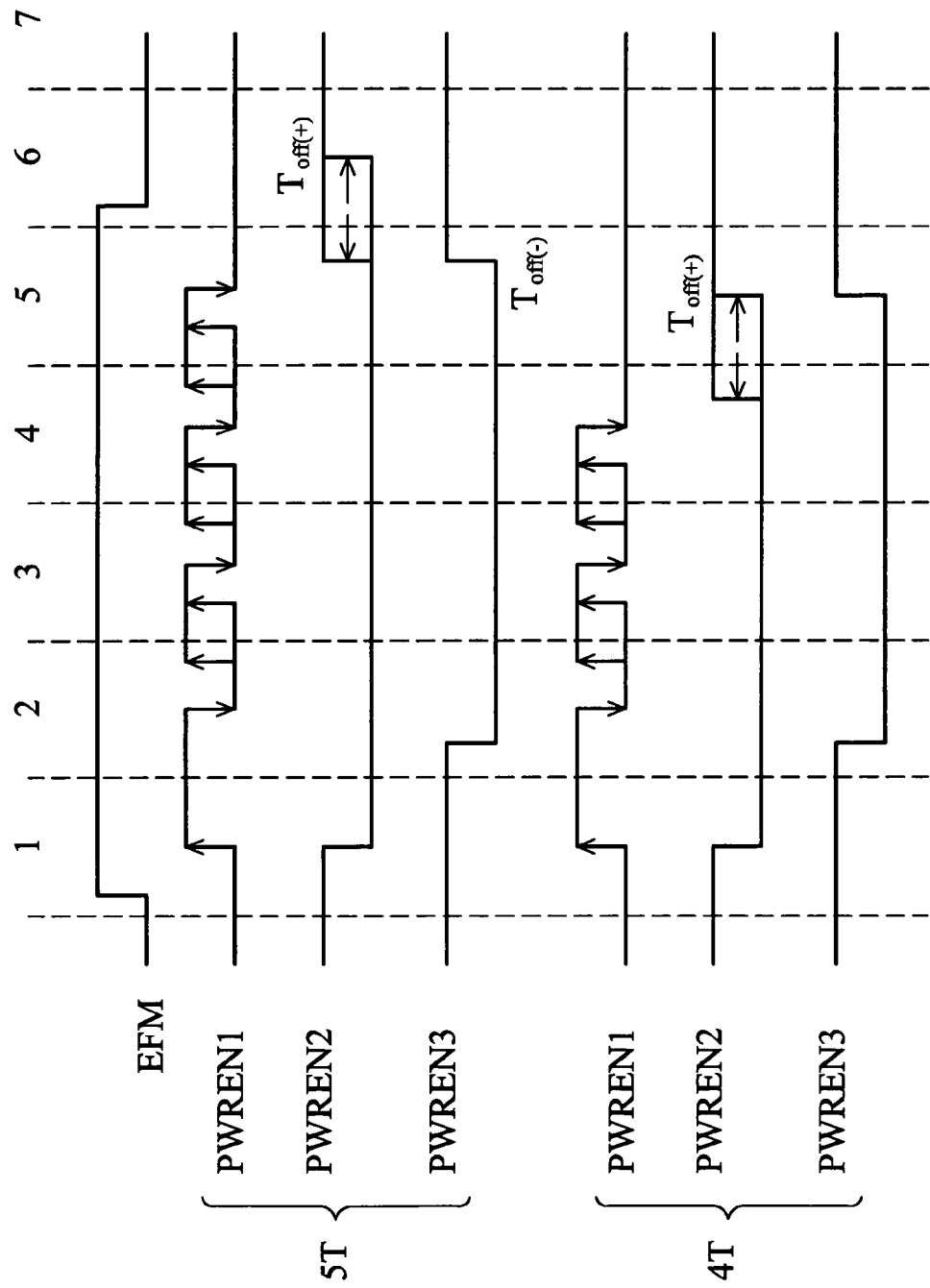
FIG. 2A and FIG. 2B shows the waveforms of low-speed and high-speed write strategies respectively.
Figure 2B:
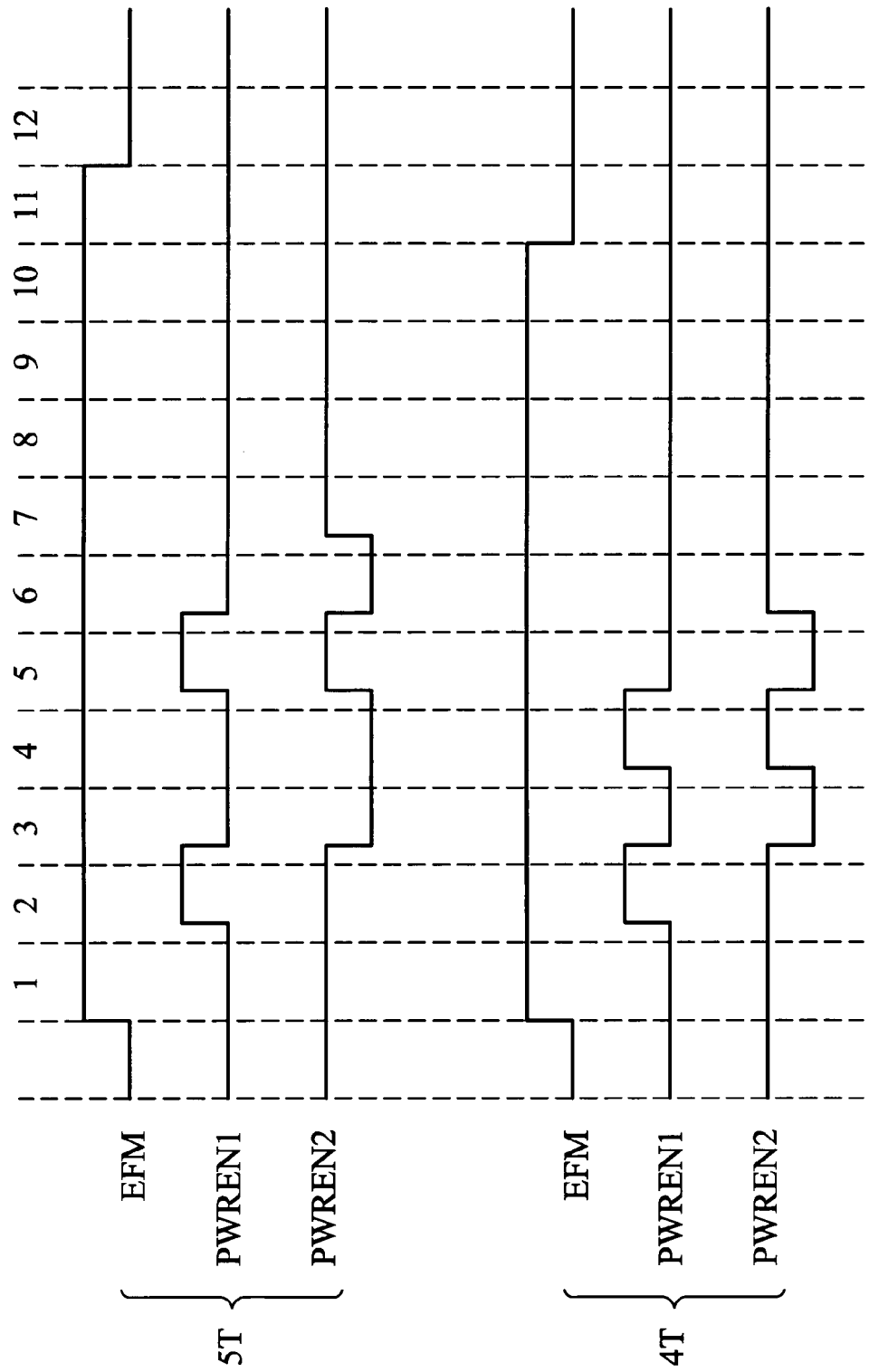

FIG. 2A and FIG. 2B shows the waveforms of low-speed and high-speed write strategies respectively. In FIG. 2A, the waveform of the low-speed write strategy for generating '5T mark' data comprises four pulses, and the waveform of the low-speed write strategy for generating '4T mark' data comprises three pulses. In FIG. 2B, the waveform of the high-speed write strategy for generating '5T mark' data comprises two pulses, and the waveform of the high-speed write strategy for generating '4T mark' data also comprises two pulses but is different from the waveform used to generate the '5T mark' data. Here, the high-speed write strategy is employed to record data at speeds exceeding 16×, and the low-speed write strategy is employed to record data at speeds lower than 16×.

The present invention provides an optical data recording method, in which write strategies are dynamically switched during data recording by firmware.

Figure 3:
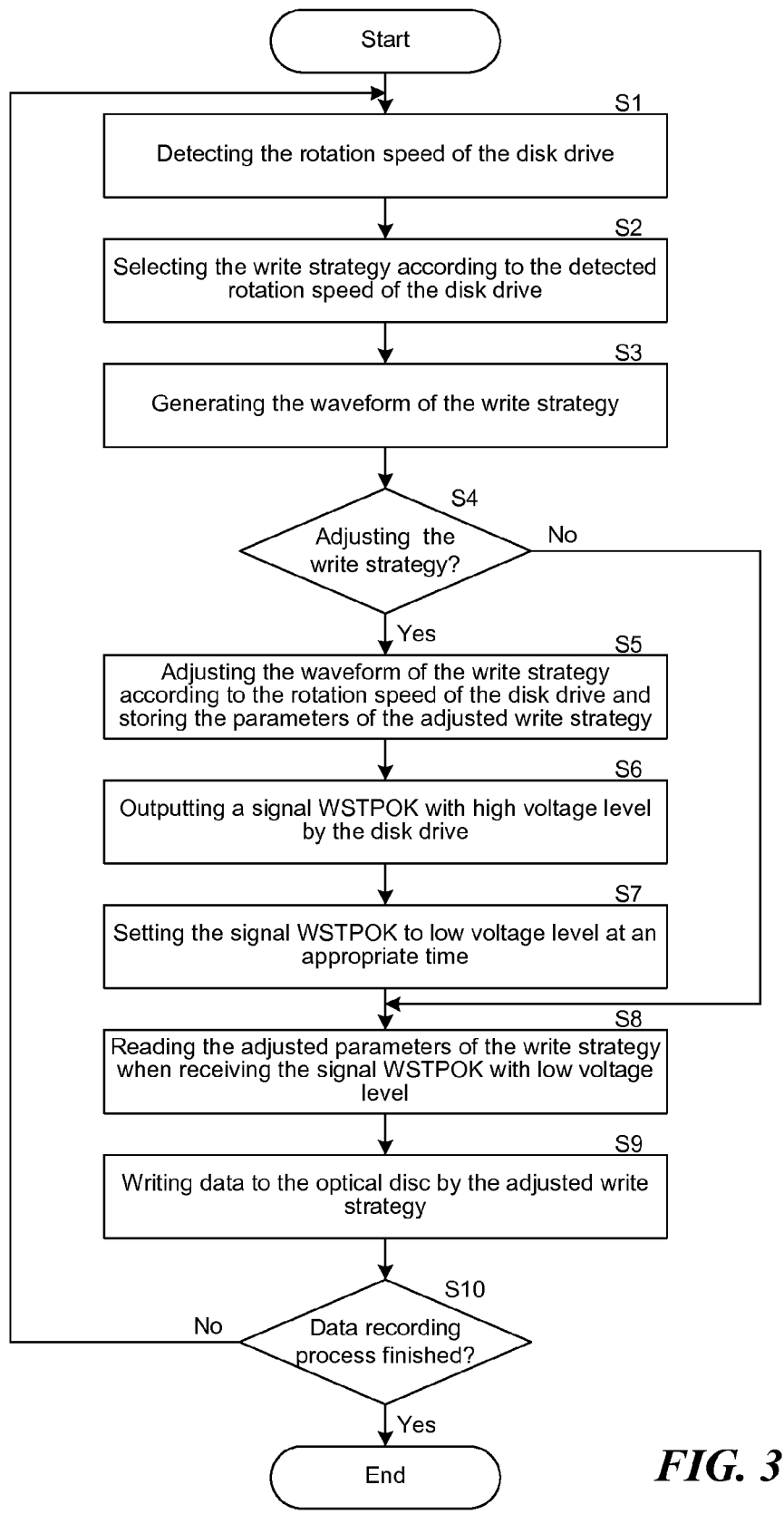
FIG. 3 shows a flowchart of the optical data recording method according to the embodiment of the present invention.

FIG. 3 shows a flowchart of the optical data recording method according to the embodiment of the present invention. In the present invention, the write strategy is determined according to the practical rotation speed of the disk drive. The practical rotation speed of the disk drive is first detected (S1). Here, the practical rotation speed of the disk drive is determined at least according to the quality of the optical disc or the performance of the host computer. In addition, in CAV (constant angular velocity) mode, the data recording speed is altered according to different recording radius of the optical disc.

Next, one of the write strategies stored in a first memory device are selected according to the detected rotation speed of the disk drive (S2). The write strategy is determined at least according to the type of optical disc, the disk drive, and the performance of the host computer. The related parameters of the write strategy are stored in a second memory device or the first memory device, comprising the recording power change time and the recording power sustain time for writing data to the optical disc.

Next, the waveform of the write strategy is generated according to the parameters read from the memory device (S3). Thus, data is written to the optical disc according to the selected write strategy. In addition, the parameters of the write strategy can be dynamically adjusted. Thus, the host computer determines if the write strategy requires adjustment (S4). Here, the write strategy is determined according to the hardware setting of the system. If yes, the disk drive generates appropriate write strategy parameters according to the practical rotation speed of the disk drive, and writes the parameters to the memory device (S5). Here, the memory device can be the same memory device used in Step S3 or another memory device. Next, the disk drive outputs a high voltage signal WSTPOK, which represent completion of the write strategy parameter adjustment (S6). After the disk drive outputs the high voltage signal WSTPOK, the host computer transforms the signal WSTPOK to low voltage level at an appropriate time, and outputs the low voltage signal WSTPOK to the disk drive (S7). It is noted that the parameters of the write strategy usually are not changed prior to the drop in voltage level from high to low of the WSTPOK signal. The disk drive reads the adjusted write strategy parameters set in Step S6 when receiving the low voltage WSTPOK signal (S8). Thus, the adjustment of the write strategy parameters is complete. If the disk drive does not receive the low voltage WSTPOK signal, the write strategy parameters performing is not changed. Finally, data is recorded to the optical disc employing the adjusted write strategy (S9).

If at Step S4, the write strategy does not require adjustment, the process skips to Step S8 directly. After recording data to the optical disc (S9), the disk drive determines if the data recording process has finished or not (S10). If not, the process returns to Step S1 to detect the rotation speed of the disk drive. If yes, the detection of the disk drive rotation speed halts. Thus, the optical data recording method according to the embodiment of the present invention is complete.

According to the embodiment of the present invention, the practical rotation speed of the disk drive is continuously detected in real-time during when data is recording. In addition, the write strategy is selected according to the detected rotation speed of the disk drive. Thus, the write strategy for recording data is adjusted or changed to meet the present rotation speed of the disk drive. Therefore, the quality of optical data recording is improved.

Figure 4:
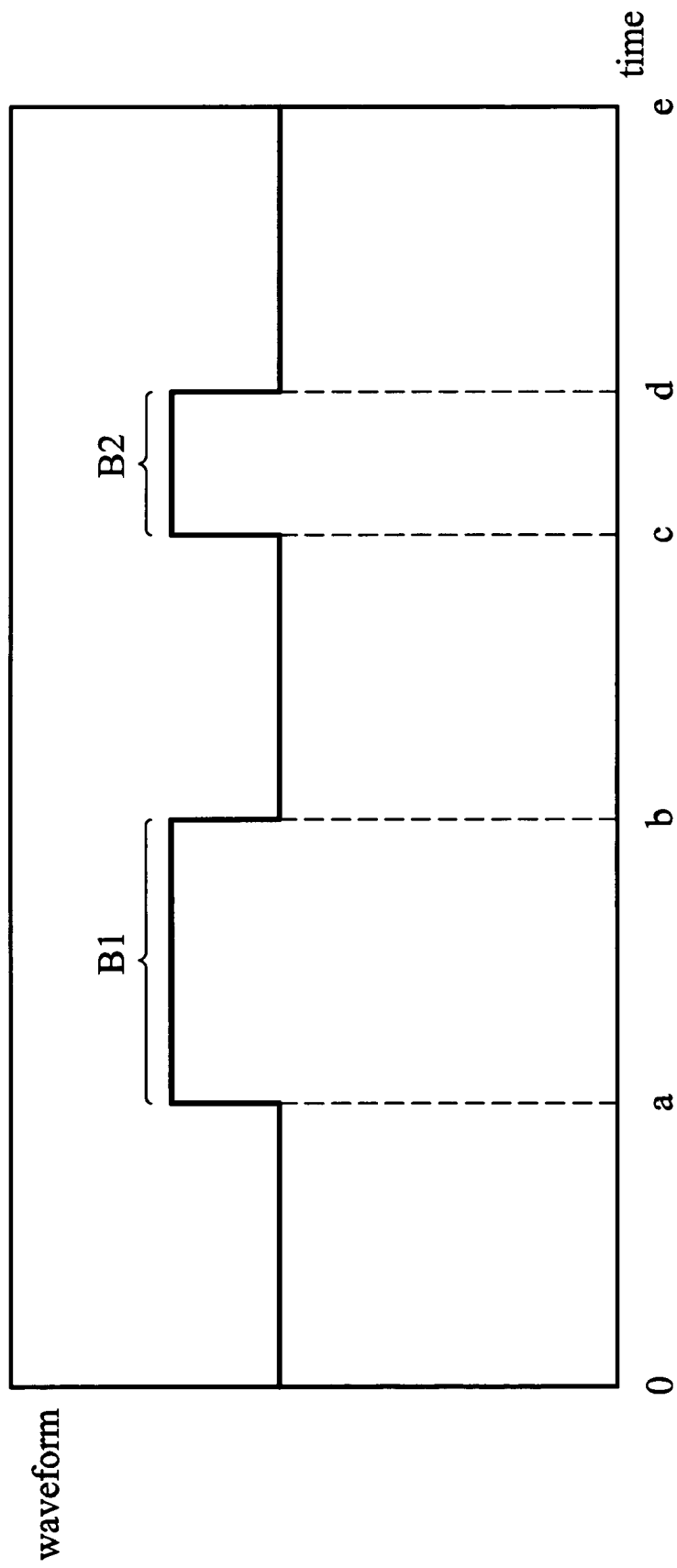
FIG. 4 shows the power waveforms for recording optical data corresponding to different write strategies.

In addition, there are many methods of accomplishing dynamic switching or adjustment of the write strategy by application, software, or firmware. For example, the rotation speed of the disk drive is continuously detected by firmware. The high-speed write strategy is written to the memory device by firmware and a signal (WSTPOK) is output to hardware when the rotation speed of the disk drive exceeds a predetermined threshold value. The hardware usually does not switch the write strategy immediately while receiving the signal (WSTPOK), rather, the hardware will switch to perform another write strategy and clear the signal (WSTPOK) after waiting for a predetermined length of mark (or space), and the predetermined length of space (or mark). As shown in FIG. 4, there are two 4T data blocks B1 and B2 to be recorded. Assuming that the practical rotation speed of the disk drive is lower than 16× when writing the data block B1 to the optical disc, the low-speed write strategy comprising three pulses is employed to record the data block B1. If the detected rotation speed of the disk drive exceeds 16× is between time points a and c, the write strategy is not changed even if the disk drive receives the signal (WSTPOK). At this point, after waiting for a predetermined length of mark (or space), and the predetermined length of space (or mark), the disk drive switches to perform another write strategy at time point c and clears the signal (WSTPOK), and then records the 4T data block B2 with the high-speed write strategy comprising two pulses.

Here, the voltage level of the signal (WSTPOK) set to '1' is output by firmware. Next, firmware continuously detects the voltage level of the signal (WSTPOK). The hardware has switched the write strategy when the voltage level of the signal (WSTPOK) becomes '0'. In addition, the purpose of the hardware waiting for a predetermined time length is to prevent simultaneous use of different write strategies to record data at the same time, which causes recording failure.

Accordingly, the present invention provides an optical data recording method for dynamically switching or changing write strategies by firmware programming or other equivalent ways to adjust recording parameters stored in the memory device, thus improving recording quality under changing disk drive rotation speeds.

The embodiment of the present invention uses CD recorders and CDRW discs as an example, however, the present invention may also be implemented with DVD recorders and DVDRW discs, and are not limited by what kind of disc and recorder is used.

The foregoing description of the invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An optical data recording method for a disc drive having a plurality of rotation speeds, comprising:

detecting a current rotation speed of the disc drive;
selecting based at least partially on the current rotation speed of the disc drive a write strategy from a plurality of write strategies corresponding to different rotation speeds of the disc drive;
writing optical data to an optical disc with the selected write strategy; and
writing optical data to the optical disc with a different write strategy, including:
 dynamically detecting a practical rotation speed of the disc drive during the writing of the optical data with the selected write strategy;
 storing adjusted write strategy parameters into a memory according to the dynamically detected practical rotation speed;
outputting a signal from the disc drive at a first level after the storing of the adjusted write strategy parameters; and
adjusting the write strategy according to the stored adjusted write strategy parameters if the signal is changed to a second level.

2. The optical data recording method as claimed in claim 1, wherein the optical disc is a CDRW disc.

3. The optical data recording method as claimed in claim 1, wherein the disc drive is a CD recorder.

4. The optical data recording method as claimed in claim 1, wherein the optical disc is a DVDRW disc.

5. The optical data recording method as claimed in claim 1, wherein the disc drive is a DVD recorder.

6. The optical data recording method as claimed in claim 1, wherein the write strategy is changed if recording data to the optical disc on at a different radial distance from the center of the optical disc.

7. The optical data recording method as claimed in claim 1, wherein the write strategy represents the power waveform that the disc drive used to write data to the optical disc.

8. The optical data recording method as claimed in claim 1, wherein the write strategy is stored in a memory device.

9. The optical data recording method as claimed in claim 1, wherein the write strategy is changed if the practical rotation speed of the disc drive exceeds a predetermined rotation speed.

10. An optical data recording method for a disc drive having a plurality of rotation speeds, comprising
 detecting a first rotation speed of the disc drive;
 selecting from a plurality of write strategies corresponding to different rotation speeds of the disc drive a write strategy based at least partially on the detected first rotation speed of the disc drive;
 generating a power waveform for writing data to an optical disc according to the selected write strategy;
 dynamically adjusting the write strategy according to a variation of rotation speed of the disc drive;
 storing the adjusted write strategy to a first memory device;
 reading the first memory device, and writing optical data to the optical disc with the adjusted write strategy;
 detecting a second rotation speed of the disc drive during writing of optical data, and generating another power waveform for writing data to the optical disc according to another write strategy if the second rotation speed of the disc drive is changed to correspond to the other write strategy;
 dynamically adjusting the another write strategy according to the variation of rotation speed of the disc drive;
 storing the adjusting result of the another write strategy to the first memory device;
 outputting a signal at a first level after the storing of the adjusted result; and reading the first memory device and writing optical data to the optical disc according to the adjusting result of the another write strategy if the signal is changed to a second level.

11. The optical data recording method as claimed in claim 10, wherein the optical disc is a CDRW disc.

12. The optical data recording method as claimed in claim 10, wherein the disc drive is a CD recorder.

13. The optical data recording method as claimed in claim 10, wherein the optical disc is a DVDRW disc.

14. The optical data recording method as claimed in claim 10, wherein the disc drive is a DVD recorder.

15. The optical data recording method as claimed in claim 10, wherein the write strategy is changed if recording data to the optical disc on at a different radial distance from the center of the optical disc.

16. The optical data recording method as claimed in claim 10, wherein the write strategy is stored in a second memory device.

17. The optical data recording method as claimed in claim 10, wherein the write strategy is adjusted to modify a power change time and a power sustain time of the power waveform for writing data to the optical disc.

18. The optical data recording method as claimed in claim 17, wherein the power waveform for writing data to the optical disc is modified according to the adjusted write strategy.

19. An optical data recording method for disc drive having a plurality of rotation speeds, comprising:
 detecting a first rotation speed of the disc drive;
 selecting from a plurality of write strategies corresponding to different rotation speeds of the disc drive a write strategy based at least partially on the detected first rotation speed of the disc drive;
 generating a power waveform for writing data to an optical disc according to the selected write strategy, wherein the power waveform for writing data to the optical disc is modified according to the adjusted write strategy;
 dynamically adjusting the write strategy according to a variation of rotation speed of the disc drive;
 storing the adjusted write strategy to a first memory device;
 reading the first memory device, and writing optical data to the optical disc with the adjusted write strategy;
 detecting a second rotation speed of the disc drive during writing of optical data, and generating another power waveform for writing data to the optical disc according to another write strategy if the second rotation speed of the disc drive is changed to correspond to the other write strategy;
 dynamically adjusting the another write strategy according to the variation of rotation speed of the disc drive, wherein the write strategy is adjusted to modify a power change time and a power sustain time of the power waveform for writing data to the optical disc;
 storing the adjusting result of the another write strategy to the first memory device;
 reading the first memory device, and writing optical data to the optical disc according to the adjusting result of the another write strategy;
 outputting a signal with a first level by the disc drive to a host computer after dynamically adjusting the write strategy;
 changing the signal to a second level by the host computer at a predetermined time, and outputting the signal to the disc drive; and
 reading the first memory device by the disc drive to obtain the adjusted write strategy if receiving the signal with the second level, wherein the write strategy is changed if the rotation speed of the disc drive exceeds a predetermined rotation speed.

20. The optical data recording method as claimed in claim 10, wherein the write strategy is changed if the rotation speed of the disc drive exceeds a predetermined rotation speed.

21. The optical data recording method as claimed in claim 1, wherein the different rotation weeds at least partially correspond to a plurality of speed factors, wherein each of the plurality of speed factors is at least approximately a multiple of a base data transfer rate, and wherein the selecting the write strategy is based at least partially on whether the current rotation speed of the disc drive corresponds to a speed factor which exceeds 16×.

22. The optical data recording method as claimed in claim 1, wherein the signal is changed to the second level by a host computer.

* * * * *

UNITED STATES PATENT AND TRADEMARK OFFICE
CERTIFICATE OF CORRECTION

PATENT NO. : 7,688,694 B2  Page 1 of 1
APPLICATION NO. : 10/959074
DATED : March 30, 2010
INVENTOR(S) : Ying-Lang Chuang et al.

It is certified that error appears in the above-identified patent and that said Letters Patent is hereby corrected as shown below:

In column 5, line 43, in claim 10, after "comprising" insert -- : --.

In column 6, line 27, in claim 19, delete "for" and insert -- for a --, therefor.

In column 7, line 8, in claim 21, delete "weeds" and insert -- speeds --, therefor.

Signed and Sealed this

Twenty-second Day of June, 2010

David J. Kappos
*Director of the United States Patent and Trademark Office*